(12) United States Patent
Bosua

(10) Patent No.: US 8,920,133 B2
(45) Date of Patent: Dec. 30, 2014

(54) ADAPTOR FOR AN AIR COMPRESSOR AND AN AIR COMPRESSOR

(75) Inventor: Christopher John Bosua, The Basin (AU)

(73) Assignee: Ears Deutschland GmbH & Co., Bevensen (DE)

( * ) Notice: Subject to any disclaimer, the term of this patent is extended or adjusted under 35 U.S.C. 154(b) by 1253 days.

(21) Appl. No.: 11/993,173

(22) PCT Filed: Jun. 1, 2006

(86) PCT No.: PCT/AU2006/000748
§ 371 (c)(1),
(2), (4) Date: Dec. 19, 2007

(87) PCT Pub. No.: WO2007/006074
PCT Pub. Date: Jan. 18, 2007

(65) Prior Publication Data
US 2010/0183452 A1    Jul. 22, 2010

(30) Foreign Application Priority Data
Jul. 7, 2005 (AU) .............................. 2005903616

(51) Int. Cl.
| | |
|---|---|
| *F04B 49/035* | (2006.01) |
| *F16K 27/02* | (2006.01) |
| *F04B 41/02* | (2006.01) |
| *F04C 29/12* | (2006.01) |
| *F04B 39/12* | (2006.01) |
| *F01C 13/02* | (2006.01) |
| *F04C 18/16* | (2006.01) |

(52) U.S. Cl.
CPC ............. *F04B 41/02* (2013.01); *F16K 27/0263* (2013.01); *F01C 13/02* (2013.01); *F04C 29/124* (2013.01); *F04C 18/16* (2013.01); *F04B 39/123* (2013.01)
USPC ...... 417/307; 417/309; 417/440; 137/565.15; 137/565.18

(58) Field of Classification Search
USPC ........ 417/307, 309, 440; 137/565.13, 565.15, 137/565.17, 565.18; 222/318
See application file for complete search history.

(56) References Cited

U.S. PATENT DOCUMENTS 3,791,776 A * 2/1974 Grant ............................ 417/440
4,089,623 A * 5/1978 Hofmann, Jr. ................ 417/295
(Continued)

FOREIGN PATENT DOCUMENTS

| DE | 2410832 A1 | 9/1975 |
|---|---|---|
| DE | 120825 | 7/1976 |

(Continued)

OTHER PUBLICATIONS

International Search Report for PCT/AU06/00748.
(Continued)

*Primary Examiner* — Charles Freay
*Assistant Examiner* — Christopher Bobish
(74) *Attorney, Agent, or Firm* — Moore & Van Allen PLLC; W. Kevin Ransom

(57) ABSTRACT

The invention discloses an adaptor (10,50) for an air compressor (11,51). Adaptor (10,50) includes a manifold (14,52) having an inlet (20,74) adapted to be connected to the air exhaust of at least one air tool device (34) having an air motor connected, in use, to the air compressor (11, 51). An outlet (12,54) is adapted to be connected, in use, to the air intake of the air compressor (11,51), an air inlet (16,70) is open to ambient air and a valve mechanism (33,66) is adapted to, in use, close the air inlet (16,70) when a first predetermined pressure is reached by the air compressor (11,51).

20 Claims, 3 Drawing Sheets

(56) References Cited

U.S. PATENT DOCUMENTS

| | | | |
|---|---|---|---|
| 4,549,856 A | 10/1985 | Cash et al. | |
| 4,642,033 A * | 2/1987 | Boller | 417/295 |
| 6,089,413 A * | 7/2000 | Riney et al. | 222/318 |
| 6,672,285 B2 * | 1/2004 | Smith et al. | 123/446 |
| 6,959,836 B2 * | 11/2005 | Collasius et al. | 222/1 |
| 7,399,004 B2 * | 7/2008 | Wiborg | 285/316 |
| 7,607,899 B2 * | 10/2009 | Van Praag et al. | 417/440 |
| 7,648,343 B2 * | 1/2010 | Cornwell | 417/53 |

FOREIGN PATENT DOCUMENTS

| | | |
|---|---|---|
| JP | 2002174203 | 6/2002 |
| WO | WO02/068858 A1 | 9/2002 |

OTHER PUBLICATIONS

Mexican Office Action for MX/a/2008/000280 dated Jul. 27, 2011.

* cited by examiner

100 US 8,920,133 B2

ADAPTOR FOR AN AIR COMPRESSOR AND AN AIR COMPRESSOR

FIELD OF THE INVENTION

This invention relates, in general to an adaptor for an air compressor and relates more particularly, though not exclusively, to an air compressor system.

BACKGROUND OF THE INVENTION

Air compressors come in varying configurations, for example, screw compressors and piston compressors. Air is compressed and delivered by hoses to one or more air tools, for example, pneumatic drills, staple guns and other pneumatically driven devices. These tools contain an air motor which is powered by the pressurised air source from the air compressor. The air motor produces exhaust air which is vented to ambient air. The escape of exhaust air is noisy. The air compressor will not usually support sustained use of the air tool because of the resulting pressure drop.

It has been proposed in German Patent Application No. 24 10 832 to have the exhaust air from a compressed air tool recycled under pressure to the intake side of the air compressor via an auxiliary pressure vessel. The disclosure includes a large number of components including piping, valves and gauges which must be fitted to an existing air compressor. The compressed air return line from the auxiliary pressure vessel is connected to only one cylinder of a multiple piston-type air compressor. The auxiliary pressure vessel buffers the returning exhaust air. This proposal is impractical, in use, because of the bulk of an auxiliary tank and the additional components needed to operate the system.

In published Japanese Patent Application No. 2002-174203 an air actuator system is disclosed. This application illustrates the use of air actuators for an air press rather than air motors. The intake of the compressor creates a vacuum on the exhaust side of the air actuators rather than an air boost. The preferred embodiments show the use of multiple actuator valves and electronics to control the system.

SUMMARY OF THE INVENTION

It is therefore an object of the present invention to provide an adaptor that can be fitted to any air compressor to allow sustained use of an air tool attached thereto.

A further object of the present invention is to provide an adaptor that can increase the output rating of an air compressor.

A still further object of the invention is to provide an adaptor that is easily fitted or integrated with an air compressor without using a lot of components or electronics.

With these objects in view the present invention in a preferred aspect may provide an adaptor for an air compressor, said adaptor including a manifold having an inlet adapted to be connected to the air exhaust of at least one air tool device having an air motor connected, in use, to said air compressor, and an outlet adapted to be connected, in use, to the air intake of said air compressor, an air inlet open to ambient air and a valve mechanism adapted to, in use, close said air inlet when a first predetermined pressure is reached by said air compressor.

Preferably said adaptor further includes a pressure relief valve which opens to exhaust compressed air at a second predetermined pressure. Preferably a plurality of said outlets are provided which are adapted to be connected to respective air intakes of a multiple cylinder air compressor.

The invention may also provide an air compressor with an adaptor of the type defined above attached or integrated therewith.

The invention also provides air compressor including a manifold having an inlet adapted to be connected to the air exhaust of at least one air tool device having an air motor connected, in use, to said air compressor, and an outlet adapted to be connected, in use, to the air intake of said air compressor, an air inlet open to ambient air and a valve mechanism adapted to, in use, close said air inlet when a first predetermined pressure, preferably of about 1 bar or 14.38 psi or higher is reached by said air compressor.

BRIEF DESCRIPTION OF DRAWINGS

In order that the invention may be more readily understood and put into practical effect, reference will now be made to the accompanying drawings, in which:—

DETAILED DESCRIPTION OF THE INVENTION

Figure 1:
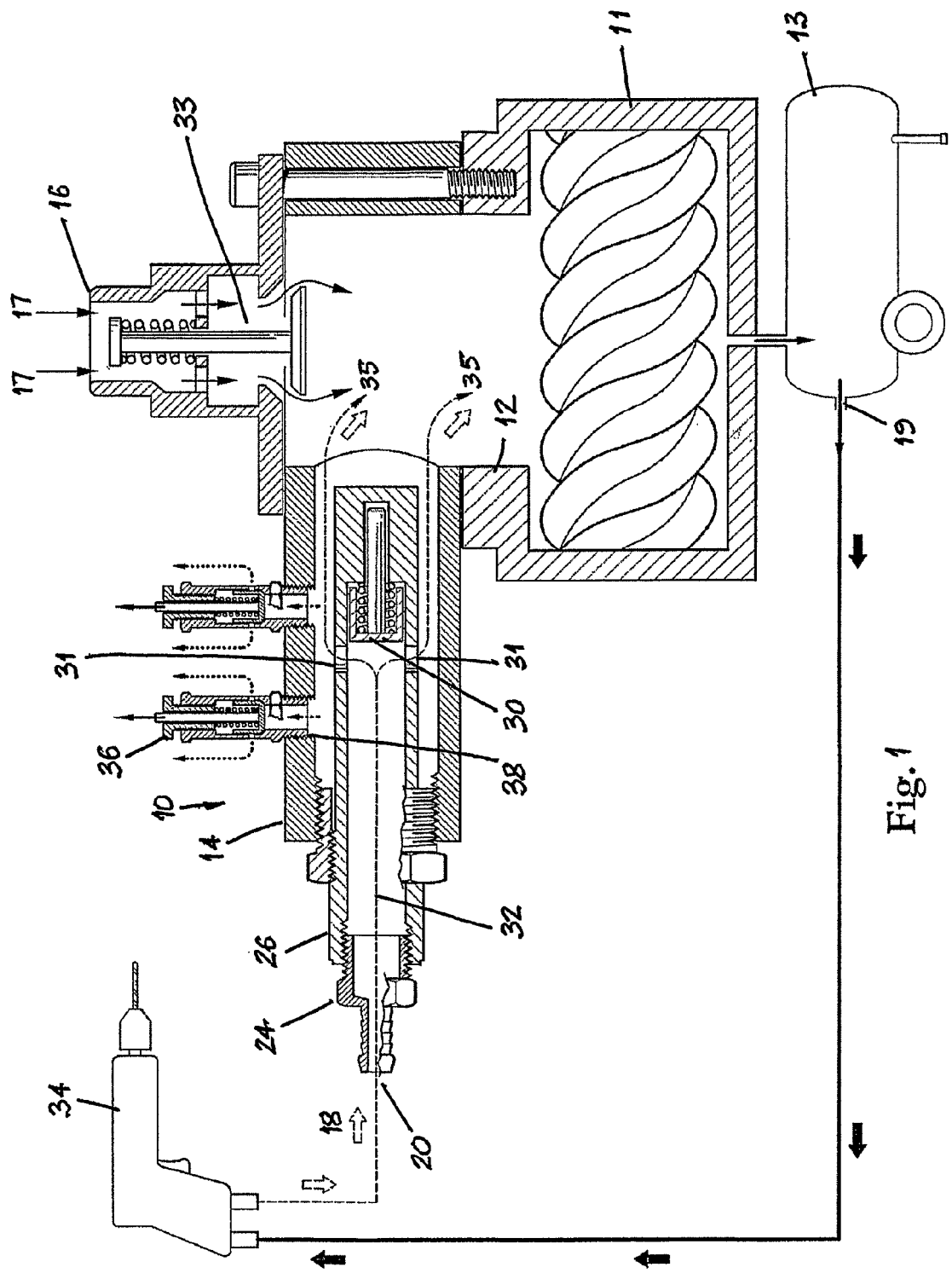
FIG. 1 is a schematic view of an adaptor made in accordance with a preferred embodiment of the invention to be used with a screw compressor.
Figure 2:
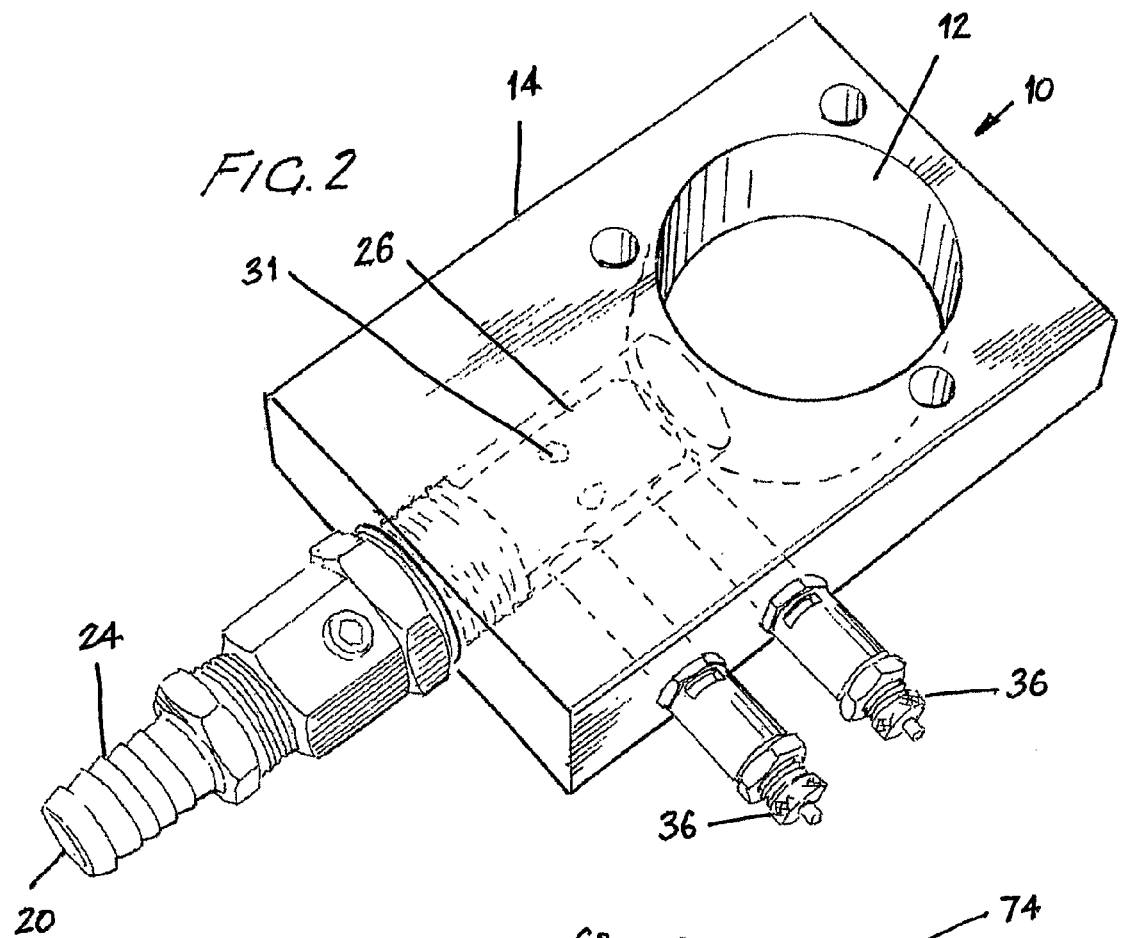
FIG. 2 is a perspective plan view of the adaptor shown in FIG. 1.

In FIGS. 1 and 2 there is shown an adaptor 10 for connection to a screw compressor 11. The brand or type of compressor is not relevant to the operation of the invention. This embodiment has been tested on a Ceccato 5 kW rotary screw compressor. Adaptor 10 is fitted to the air intake 12 of the compressor 11. Compressor 11 has a tank 13 for holding compressed air for use by an air tool 34. Adaptor 10 has a manifold 14 which mixes ambient air as indicated by arrows 17, which is provided through air inlet 16, and recycled compressed air 18 through compressed air inlet 20. Compressed air inlet 20 has a connection nipple 24 which fits into a sleeve 26 within manifold 14. Sleeve 26 includes a one-way valve 30 which opens apertures 31 when recycled exhaust compressed air 32 from air tool(s) 34 reaches a predetermined pressure. An adjustable pressure relief valve, or pair of adjustable relief valves 36 (as shown), are provided in manifold 14 and relieve excess air pressure through outlets 38. Typically, the pressure relief valves 36 will operate at about 4 Bar to ensure that the compressed air 32 does not provide too much back pressure into air intake 12. FIG. 2 in this embodiment shows the actual construction of the manifold 14 with the adjustable relief valves 36 on the side, whereas FIG. 1 shows the adjustable relief valves on the top of manifold 14 to more clearly illustrate the operation of the adaptor 10. The adjustable relief valve(s) 36 can be located in either position.

In use, adaptor 10 is fitted to the compressor 11 as discussed. When compressor 11 commences operation, valve 30 will be closed as apertures 31 will be covered and air will be drawn through air inlet 16 as indicated by arrows 17. The air will be taken directly into air intake 12 to be compressed and stored in tank 13. The compressed air outlet 19 of from tank 13 is coupled to air tool(s) 34 which may have their exhausts returned to manifold 14 through connection nipple 24. It is not necessary that all exhausts of all air tools be returned to connection nipple 24. For example, a spray gun which does not have an air motor will not be connected but a drill would be. Pressure will build up in sleeve 26 until the pressure opens valve 30. The pressure will be kept at about 4 Bar by pressure relief valve(s) 36. Once valve 30 opens, air inlet 16 will be shut through valve 33 and a closed loop will be formed from the exhaust from the air tool(s) 34 to the air intake 12. In an especially preferred embodiment the valve 33 will act to close the air inlet 16 at a pressure of about 1 bar or 14.38 psi or higher. The adaptor 10 will stop ambient air entering the compressor which is laden with air borne moisture. The compressed air will be drier which improves the life of the compressor 11 and the air tools 34 attached to it. As compressed air (indicated by arrows 35) enters the compressor 11, the compressor 11 will have less work to do as the recycled compressed air has already been compressed to a pressure of 4 Bar. This recycling will increase the output of the compressor 11.

This embodiment was tested against the compressor without fitting of the adaptor 10 thereto. Without the adaptor, and starting at 8.5 Bar, the compressor took 3 to 5 minutes before the pressure dropped back to 5.2 Bar using an air drill attached thereto. At that time the discharge air from the cooling system on the compressor was 32° C., with the air end at 57° C. and the tank discharge pipe at 22° C.

With the adaptor 10 fitted, it took 9 minutes for the pressure to drop to 5.7 Bar and the compressor sustained that pressure for 16 minutes when the test was terminated. At 5.7 Bar the air drill could still function at normal efficiency. When the test was terminated the discharge air from the cooling system on the compressor was 27° C. (compared with 32° C.) with the air end at 45° C. (compared with 57° C.) and the tank discharge pipe at 18° C. (compared with 22° C.). As the compressed exhaust air is colder than the ambient temperature, the compressor will run cooler. The compressor will run automatically and does not require air to either be manually allowed to escape, to prevent excess pressure, or to manually add air. These drops in temperature are significant as long term maintenance is reduced in view of the compressor running cooler. The air tools will be less noisy as the exhaust air is returned to the compressor rather than ambient air. Smaller compressors can thus be used which may avoid the use of 3 phase electric power compressors.

Figure 4:
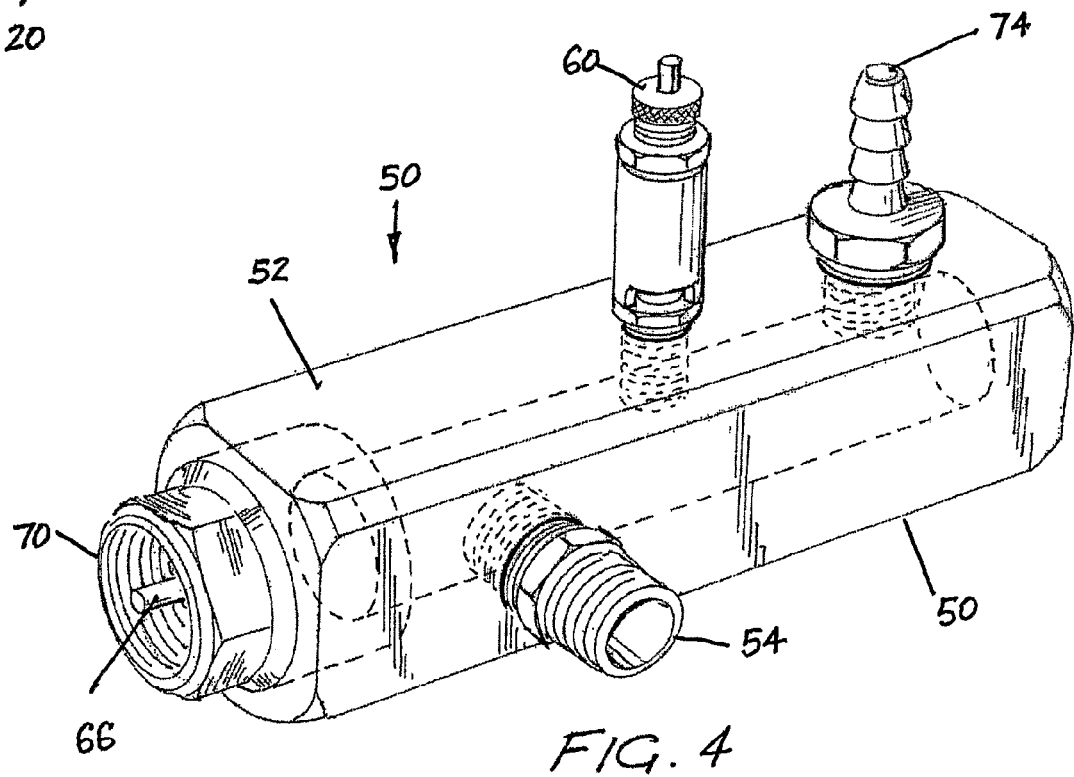
FIG. 4 is a perspective view of the adaptor shown in FIG. 3.
Figure 3:
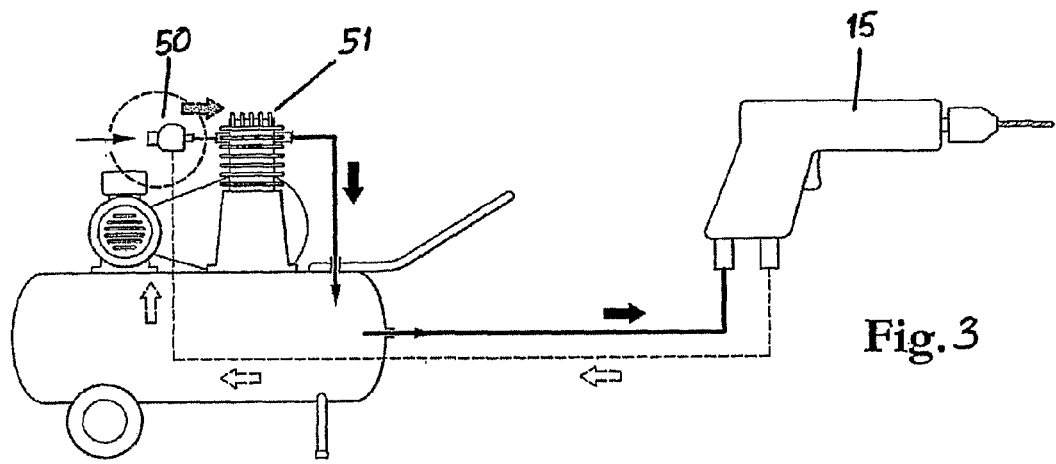
FIG. 3 is a schematic view of an adaptor made in accordance with a second preferred embodiment of the invention to be used with a single cylinder compressor.
Figure 5:
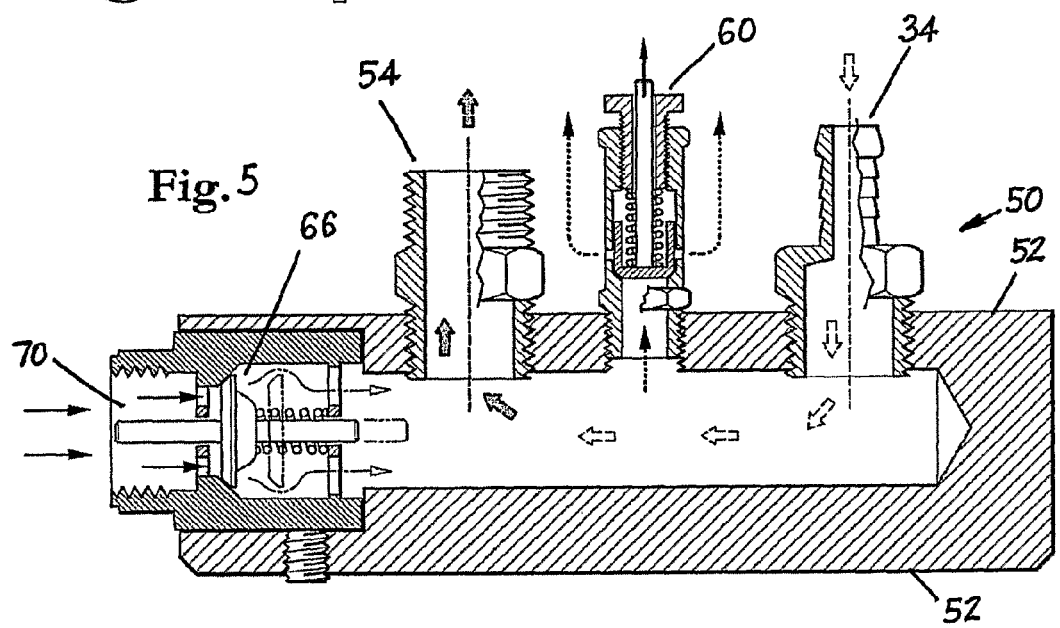
FIG. 5 is a diagrammatic cross-sectional view showing the operation of the adaptor
Figure 6:
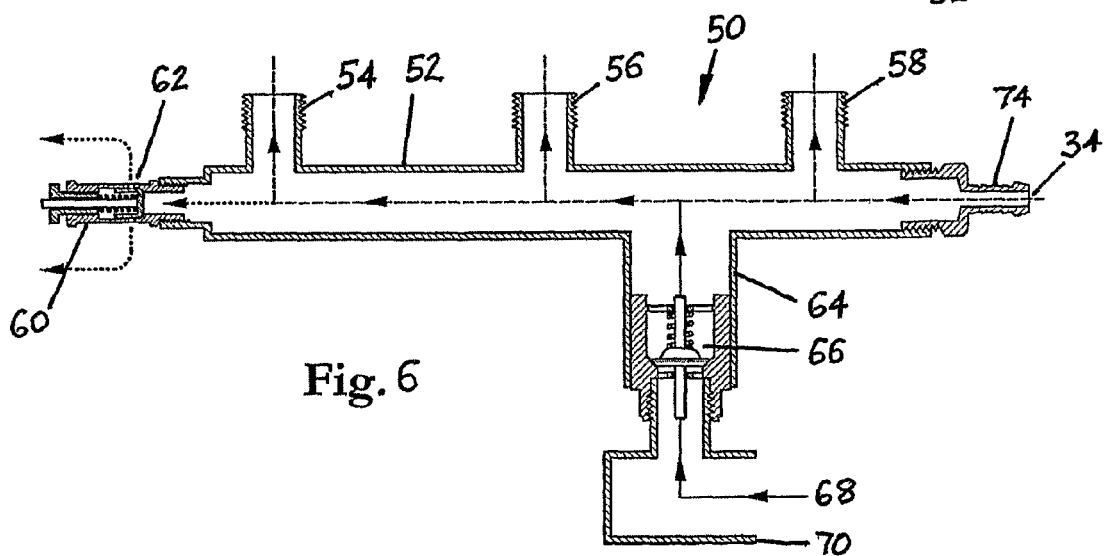
FIG. 6 is a third embodiment of the adaptor shown in FIG. 5 for a multi-cylinder compressor.

In FIGS. 3 to 6, an adaptor 50 is shown. Adaptor 50 in this embodiment is coupled to a piston type compressor 51. FIGS. 3 to 5 show adaptor 50 for a single cylinder compressor 51 whilst FIG. 6 shows adaptor for a 3 cylinder compressor (not shown). Adaptor 50 in FIG. 6 has a manifold 52 with three (3) air outlets 54, 56, 58 which are adapted to be connected to respective air intake ports (not shown) of each cylinder of the compressor. An adjustable pressure relief valve 60 is provided at the end of manifold 52 adjacent air outlet 54. The pressure relief valve 60 operates in a similar manner to that of valve(s) 36 in FIG. 1 and has an outlet(s) 62. Arm 64 opening into manifold 52 includes a one-way valve 66 which allows ambient air 68 to enter air intake 70. Exhaust air 72 enters exhaust inlet 74.

The operation of this embodiment is similar to the embodiment of FIGS. 1 and 2. Air 68 is drawn into air intake 70 through open one-way valve 66 and enters manifold 52. Air flows into air outlets 54, 56, 58 and is compressed by the compressor. Once operating pressure has been reached valve 66 will close and a closed loop will be formed from the exhaust of the air tool(s) 34 to manifold 52.

In this embodiment, adaptor 50 has been tested with a McMillan single phase 2.2 kW compressor having three (3) cylinders. This embodiment was tested against the compressor without fitting of the adaptor 50 thereto. Without the adaptor and starting at 8.5 Bar, the compressor took 57 seconds before the pressure dropped back to 4.0 Bar using an air drill attached thereto. With the adaptor 50 fitted, it took 6.5 minutes for the pressure to drop to 5.0 Bar and the compressor sustained that pressure for 9 minutes when the test was terminated. At 5.0 Bar the air drill could still function at normal efficiency.

Although the embodiment shown in FIG. 6 is for a multicylinder compressor, the invention can be used with a single cylinder compressor as shown in FIGS. 3 to 5. The same reference numerals have been used in FIGS. 3 to 5 as those in FIG. 6 to avoid repetition of description. As with the embodiment shown in FIGS. 1 and FIG. 2 actual construction of the manifold 50 with the air outlet 54 on the side is shown in FIG. 4, whereas FIG. 5 shows the air outlet 54 on the top of manifold 52 to more clearly illustrate the operation of the adaptor 50. The positions of air outlet 54, relief valve 36, air intake 70 and exhaust inlet 74 can be located in any suitable position. The invention will operate on any type of compressor and is not limited to its use with screw, vane or piston compressors.

The invention does not require electronics, pneumatics, switches, solenoids, auxiliary tanks or other paraphernalia that the prior art requires. The number of components has been drastically reduced resulting in a substantial reduction in maintenance. The simplicity of the invention virtually eliminates any breakdown from the invention. As the air is forced into the compressor, when operating, at above 1 atmosphere, there are less compressions from the compressor to fill the tank to the required pressure. Instead of only one bar of pressure (i.e. atmosphere) being able to enter the compressor cylinder, the invention can have up to four bar allowing the compressor to compress three times more air in one revolution. Although the invention is capable of delivering four times the power, working the machine at this level would put too great a stress on the air compressor motor. To minimise stress on the motor while optimising performance, the invention is typically tuned to deliver about twice the pressure of similar-sized conventional compressors. Air compressors are also notoriously noisy machines and the invention is able to reduce the noise by up to 50 percent. The invention has other benefits including improving occupational health and safety because it removes any potential hazard the exhausted air may cause for the operator of the tools. Moisture is reduced and heat within the air system thereby prolonging the life of the air tools. When air is compressed it creates a lot of heat and when suddenly exhausted—as is the case when using the air tools—that air is cooled significantly (by up to 35 degrees). In the invention, that cooled, exhausted air is now being recycled into the compression system to keep it cool. Moisture is reduced because the adaptor is not sucking in fresh, ambient air (which contains humidity) to fill the compressors. It is simply recycling the air.

The embodiments depict adaptors 10, 50 which can be retro-fitted to a compressor but they may also be integrated into the design of the compressor per se. The invention has the flexibility of being able to be used with existing compressors or can form the basis for an integrated new design in compressors.

The invention will be understood to embrace many further modifications as will be readily apparent to persons skilled in the art and which will be deemed to reside within the broad scope and ambit of the invention, there having been set forth herein only the broad nature of the invention and certain specific embodiments by way of example.

The invention claimed is:

1. An adaptor for use with an air compressor, said adaptor configured for operative placement between an air exhaust of an air tool device and an air intake of an air compressor, wherein said adaptor comprises a manifold comprising:
   a compressed air inlet adapted to be connected to the air exhaust of at least one air tool device having an air motor connected, in use, to the air compressor, said compressed air inlet comprising a one-way valve adapted to block the flow of the air exhaust through said compressed air inlet until the pressure of the air exhaust in said compressed air inlet exceeds a predetermined air exhaust pressure;
   an outlet adapted to be connected, in use, to the air intake of the air compressor;
   an ambient air inlet open to ambient air;
   a valve mechanism adapted to, in use, close said ambient air inlet when a first predetermined pressure is reached by the air compressor.

2. The adaptor as claimed in claim 1, further including a pressure relief valve which opens to exhaust compressed air at a second predetermined pressure.

3. The adaptor of claim 1, wherein a plurality of said outlets are provided which are adapted to be connected to respective air intakes of a multiple cylinder air compressor.

4. The adaptor of claim 1, wherein said compressed air inlet is at one end of said manifold and said ambient air inlet and said outlet are located on the side of said manifold.

5. The adaptor of claim 1, wherein said valve mechanism closes said ambient air inlet at about 1 bar or 14.38 psi or higher.

6. The adaptor of claim 1, wherein said outlet is directly connected to the air injection device of the air compressor.

7. An adaptor for use with an air compressor, said adaptor configured for operative placement between an air exhaust of an air tool device and an air intake of an air compressor, wherein said adaptor comprises a manifold comprising:
   a first air inlet adapted to be connected to the air exhaust of at least one air tool device having an air motor connected, in use, to the air compressor;
   an outlet adapted to be connected, in use, to the air intake of the air compressor;
   a second air inlet open to ambient air; and
   a first valve mechanism adapted to, in use, close said second air inlet when a first predetermined pressure is reached by the air compressor,
   wherein said first air inlet comprises:
      a sleeve comprising one or more apertures in fluid communication with the air intake of the air compressor and adapted to, in use, receive air exhaust of the at least one air tool device; and
      a second valve mechanism positioned within said sleeve and being adapted to, in use, operatively open and close the one or more apertures, and adapted to automatically open the one or more apertures when a predetermined air exhaust pressure is reached within said sleeve to thereby expose the one or more apertures to the air exhaust of the at least one air tool device.

8. The adaptor as claimed in claim 7, further including a pressure relief valve which opens to exhaust compressed air at a second predetermined pressure.

9. The adaptor of claim 7, wherein a plurality of said outlets are provided which are adapted to be connected to respective air intakes of a multiple cylinder air compressor.

10. The adaptor of claim 7, wherein said first air inlet is at one end of said manifold and said second air inlet and said outlet are located on the side of said manifold.

11. The adaptor of claim 7, wherein said valve mechanism closes said second air inlet at about 1 bar or 14.38 psi or higher.

12. The adaptor of claim 7, wherein said outlet is directly connected to the air injection device of the air compressor.

13. An adaptor for use with an air compressor, said adaptor configured for operative placement between an air exhaust of an air tool device and an air intake of an air compressor, wherein said adaptor comprises:
   a manifold comprising a chamber;
   a first air inlet connected to said manifold and adapted to be connected, in use, to the air exhaust of at least one air tool device having an air motor connected, in use, to the air compressor, said first air inlet comprising a one-way valve adapted to block the flow of the air exhaust through said first air inlet until the pressure of the air exhaust in said first air inlet exceeds a predetermined air exhaust pressure;
   an outlet connected to said manifold and adapted to be releasably connected, in use, to the air intake of the air compressor;
   a second air inlet connected to said manifold and open to ambient air; and
   a valve mechanism adapted to, in use, close said second air inlet when a first predetermined pressure is reached within the chamber,
   wherein said chamber is in direct fluid communication with each of said first air inlet, said second air inlet, and the air intake of the air compressor, wherein each of said first air inlet and said second air inlet supplies air first to said chamber to thereby then supply air from said chamber to the air intake of the air compressor.

14. The adaptor as claimed in claim 13, further including a pressure relief valve which opens to exhaust compressed air at a second predetermined pressure.

15. The adaptor of claim 13, wherein a plurality of said outlets are provided which are adapted to be connected to respective air intakes of a multiple cylinder air compressor.

16. The adaptor of claim 13, wherein said first air inlet is at one end of said manifold and said second air inlet and said outlet are located on the side of said manifold.

17. The adaptor of claim 13, wherein said valve mechanism closes said second air inlet at about 1 bar or 14.38 psi or higher.

18. The adaptor of claim 13, wherein said outlet is directly connected to the air injection device of the air compressor.

19. The adaptor of claim 1, wherein the air compressor is a screw compressor.

20. The adaptor of claim 1, wherein a tank is connected to the air compressor and the air tool device, the tank being adapted to store air compressed by the air compressor for use by the air tool device.

* * * * *